United States Patent [19]
Alexiev et al.

[11] 3,897,494
[45] July 29, 1975

[54] AMINOACID DERIVATIVES

[75] Inventors: Boris Vasilev Alexiev; Stoycho Borisov Stoev; Alexander Vasilev Spasov; Lilyana Stoilova Maneva; Emanuil Alexandrov Emanuilov; Evgeni Victorov Golovinski, all of Sofia, Bulgaria

[73] Assignee: Institute po Biochimia pri Ban, Sofia, Bulgaria

[22] Filed: Sept. 26, 1973

[21] Appl. No.: 400,795

[30] Foreign Application Priority Data
Sept. 26, 1972 Bulgaria.................................. 21479

[52] U.S. Cl...... 260/561 H; 260/471 C; 260/471 R; 260/472; 260/476 R; 260/481 R; 260/482; 260/518 R; 260/534 S; 260/599 R; 260/599 T; 424/303; 424/309; 424/311; 424/319; 424/320; 424/323
[51] Int. Cl......................................... C07c 103/30
[58] Field of Search................................ 260/561 H

[56] References Cited
UNITED STATES PATENTS
3,209,025  9/1965   Lammler et al. ............... 260/561 H
3,260,746  7/1966   Broadbent et al. ............. 260/561 H OTHER PUBLICATIONS
C.A. 51: 4275d.
C.A. 54: 8657c.
C.A. 59: 752h.

Primary Examiner—Lewis Gotts
Assistant Examiner—Ethel G. Love
Attorney, Agent, or Firm—Armstrong, Nikaido & Wegner

[57] ABSTRACT

A new series of amino acids are provided which have pharmaceutical utility, particularly against bacterial infections such as Sarcina lutea and Staphlococcal mutants YF-2 and YF-3. The compounds may be administered at a concentration of 1 μm/ml. The aforesaid novel amino acids have the formula

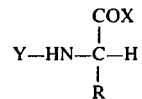

wherein
X is OH, $OC_2H_5$, $NHN(CH_2CH_2Cl)_2$;
Y is $-OCOCH_2C_6H_5$, H.HBr; and
R is $-CH_2SO_2N(CH_2CH_2Cl)_2$, $-CH_2-S-S-CH_2-CH(NHOCOCH_2C_6H_5)$.$CONHN(CH_2CH_2Cl)_2$, $CH_2-S-S-CH_2-CH(NH_2.HBr).CONH-N-(CH_2CH_2Cl)_2$.

1 Claim, No Drawings

AMINOACID DERIVATIVES

The present invention relates to the aminoacid derivatives possessing the general formula:

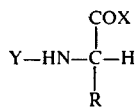

wherein:

X stands for OH, $OC_2H_5$, $NHN(CH_2CH_2CL)_2$;
Y stands for $-OCOCH_2C_6H_5$, H.HBr;
R stands for $-CH_2SO_2N(CH_2CH_2CL)_2$, $-CH_2-S-S-CH_2CH(NHOCOCH_2C_6H_5)$. $CONHN(CH_2CH_2CL)_2$, $-CH2-S-S-CH_2-CH(NH_2.HBr).CONHN(CH_2CH_2CL)_2$ and to the method of their preparation.

The aforementioned compounds belong to the group of the modified aminoacids and are investigated for their antibacterial and antitumor activities. These substances are of biological such as of chemical interest.

The preparation of the aminoacid derivatives proceeds through the interaction of a sulphochloride or an acid chloride of the aminoacid with a bis-(B-chlorethyl)amine in an acetone medium or with an asymmetrical bis-(B-chlorethyl)-hydrazine respectively in an ethylacetate medium.

The chemical reactions are as follows:

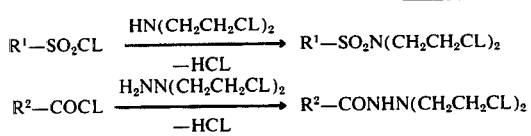

wherein
R¹ stands for 1-carbetoxy-2-benziloxycarbonylamino-3-propyl-;
R² stands for the radical of the benziloxicarbonyl-α-aminocarbonic acid.

The synthetized aminoacid derivatives are released (deblocked) as follows:
the carboxylic group — through the action of a 4 n. solution of sodium hydroxide in a water-alcoholic medium;
the amino groups — through the treatement with a solution of hydrogen bromide in glacial acetic acid. The compounds are colourless, crystalline substances. The blocked products are water insoluble, but well soluble in ethanol, acetone, ethylacetate and others organic solvents. The hydrobromides of the deblocked substances are very well soluble in water but insignificantly soluble in organic solvents.

The synthetized aminoacid derivatives show an emphasized antibacterial activity towards SARCINA LUTEA and the staphylococcal mutants YF-2 and YF-3. For example, the product L-cystine-bis(N,N-B-chlorethylhydrazine) inhibits the growth of SARCINA LUTEA and the staphylococcal mutant YF-2 97 % and 100 % respectively in a concetration of 1 μm/ml, and inhibits the growth of the staphylococcal mutant YF-3 100% in a concentration of 0,5 μm/ml. The aminoacid derivatives suppress the development of some of the transplantable tumors in experimental animals.

EXAMPLE 1

L-2-benzyloxicarbonylamino-3-[bis(N,N-B-chlorethyl)-sulphamoyl] propionic acid - ethylic ester (1).

To the solution of 3,5 gr L-2-benzyloxicarbonylamino-3-chlorsulphopropionic acid - ethylic ester in 50 ml anhydrous acetone is added bis(B-chlorethyl)amine, obtained from 3,6 gr bis-(B-chlorethyl)amine hydrochloride. After 6 hours standing at ambient (room) temperature, the reactin mixture is filtrated and the filtrate is evaporated under reduced pressure till dryness. The residue is dissolved in ethylacetate and the organic solution is washed successively with hydrochloric acid 5 %, water, sodium bicarbonate 5 % and again with water. After drying over sodium sulphate the ethylacetate bed is evaporated under reduced pressure till dryness. The residue crystallize from an ethanol-water mixture. Yield 2,90 gr (63,7 %). M.p. 97°–8°C.

Analysis: $C_{17}H_{24}CL_2N_2O_6S$ (455.4) Evaluated: % N 6,15 Found: % N 6,36
% S 7,04 % S 6,52
% CL 15,57 % CL 15,79

EXAMPLE 2

L-2-amino-3-(bis-(N-N-B-chlorethyl)sulphamoyl-propionic acid-hydrobromide (2).

2,4 gr of the product (1) are dissolved in 12 ml methanol, 5 ml of a 4 n. sodium hydroxide solution are added and the solution stands for 2 hours at the ambient temperature. After acidulating with 30 ml 1 n. solution of hydrochloric acid, a white residue is deposited, which is filtrated and dried. The isolated chromatographicaly pure substance is treated with 5 ml 30 % solution of hydrobromide in glacial acetic acid at the ambient temperature. A gradually dissolution of the product is observed, accompanied by an extensive gas liberation (carbonic dioxide). At the end of the reaction (after 2 hours) the deposition of the residue begins. After the full deposition by means of anhydrous ether, the residue is filtrated and washed multifold with dry ether. Yield 1,57 gr (42,4 %). The product is colourless and hygroscopic with M.P. 180°–185°C (sublim.)

Analysis: $C_7H_{15}BrCL_2N_2O_4S$ (374,1) Evaluated: % N 7,49 Found % N 7,70
% S 8,57 % S 8,45
%halogen (CL+Br) 40,31 % halogen 40,42

EXAMPLE 3

L-bis-(N-α-benzyloxicarbonyl)-cystine-N,N-bis-(B-chlorethyl) -dihydrazide (3).

A solution of 5 gr N-benzyloxicarbonylcystilchloride in 50 ml anhydrous ethylacetate is mixed to the asymmetrical bis-(B-chlorethyl)-hydrazine, obtained from 8 gr hydrazine hydrochloride. After standing for 12 hours at the ambient temperature a crystalline product is formed, which is filtrated and recrystallised from an ethanol-water mixture. Yield 5,7 gr (72,4 %). M.P. 191°–2°C.

Analysis: $C_{30}H_{40}CL_4N_6O_6S_2$ (786,6) Evaluated: % N 10,68 ; % S 8,15 ; %CL 18,03    Found % N 10,76 ; % S 7,78 ; %CL 18,04 bromide in glacial acetic acid. The product is first dissolved under intensive liberation of carbonic dioxide, after which the residue is deposited. After full deposition by means of anhydrous ether the solid product is filtrated and washed multifold with dry ether. Yield 3,9 gr (91,2 %). M.P. 167°–9°C. The substance is highly hygroscopic.

Analysis: $C_{14}H_{30}Br_2CL_4N_6O_2S_2$ (680,2) Evaluated: % N 12,36 ; % S 9,43 ; % halogen (CL+Br) 44,35    Found % N 12,48 ; % S 9,22 ; % halogen 44,70

EXAMPLE 4

L-cystine-bis-(N,N-B-Chlorethylhydrazide) (4).

5, 5,0 gr of the substance (3) are treated at the ambient temperature with 35 ml 30 % solution of hydrogen

What we claim is:
1. L-cystine-bis-(N,N-B-Chlorethylhydrazide).

* * * * *